United States Patent [19]

Sansone et al.

[11] Patent Number: 5,270,938
[45] Date of Patent: Dec. 14, 1993

[54] MAIL PIECE WEIGHT MONITORING SYSTEM AND METHOD

[75] Inventors: Ronald P. Sansone; Robert P. Kemper, both of Weston, Conn.

[73] Assignee: Pitney Bowes, Inc., Stamford, Conn.

[21] Appl. No.: 611,614

[22] Filed: Nov. 13, 1990

[51] Int. Cl.$^5$ .............................. G07B 17/00
[52] U.S. Cl. .................. 364/464.02; 364/464.03; 395/100
[58] Field of Search .............. 177/1, 3, 4, 25.15; 364/464.02, 464.03, 518, 519, 521; 395/100

[56] References Cited

U.S. PATENT DOCUMENTS

| | | | |
|---|---|---|---|
| 3,861,480 | 1/1975 | Zucker et al. | 177/229 X |
| 3,877,531 | 4/1975 | Storace et al. | 177/1 |
| 4,516,209 | 5/1985 | Scribner . | |
| 4,908,768 | 3/1990 | Gelfer et al. | 364/464.03 |
| 4,959,795 | 9/1990 | Christensen et al. | 364/464.03 |
| 5,001,648 | 3/1991 | Baker | 364/464.03 |
| 5,024,282 | 6/1991 | Raikes et al. | 364/464.03 X |

*Primary Examiner*—Edward R. Cosimano
*Attorney, Agent, or Firm*—Peter Vrahotes; Melvin J. Scolnick

[57] ABSTRACT

This invention relates to a system for and method of determining the accuracy of mail piece weights. The weight of individual mail pieces during a mail run is displayed in real time. A high speed weighing scale is located downstream from the mail processing unit to receive the mail pieces after the mail processing unit has inserted selected materials into envelopes. As each mail piece is weighed, its weight is stored in memory and a display can be made showing all the weights of the individual mail pieces in real time. This display can be temporary, such as on a monitor, or permanent, such as a print out. With such display, an operator has a fast method of determining if the weights are in an expected range.

10 Claims, 3 Drawing Sheets

MAIL PIECE WEIGHT MONITORING SYSTEM AND METHOD

RELATED CASES

Attention is, directed to co-pending U.S. Pat. No. 5,119,306 filed Jan. 2, 1990 and entitled MAIL PIECE WEIGHT QUALITY CONTROL SYSTEM AND METHOD.

BACKGROUND OF THE INVENTION

Throughout the history of the Post Office, there has been a gradual evolution whereby the Post Office encourages mailers to prepare their mail in such a way as to reduce the effort required on the part of the Post Office for processing such mail. As an inducement to the mailer to prepare the mail in such a manner so as to bring about faster mail delivery, the Post Office offers mailers a discount on such items as pre-sorted mail and printing of nine digit zip codes. Discounts are given also when the mail is produced in a manner allowing automatic processing with machines such as optical character recognition (OCR) sorters and bar code readers and sorters.

Even with present mail processing techniques with reduced postage rates for pre-sorted mail, zip code mail and the like, the Post Office is still experiencing difficulties in processing the mail, not only because of the ever increasing volume of mail that is required to be delivered, but also because a significant amount of mail presented to the Post Office does not have the required postage or may not meet the requirements of postal regulations. The mail pieces may not have sufficient postage because the anticipated weight of a mail piece could be greater than expected. In equipment for processing large amounts of mail, it is frequently a practice to determine the weight of inserts of a mail piece, and together with the weight of the envelope, the total weight of the mail piece is calculated and postage paid in accordance with that calculated weight. The mail pieces are placed in trays and these trays are delivered to the Post Office. Frequently, weight errors occur which cause insufficient postage payment that results in delays being experienced by the Post Office. These errors frequently occur because extra inserts are inserted into envelopes as when inserts stick to one another and a plurality are inserted when only a single insert is called for. Another occurance is faulty equipment.

The Post Office has been seeking ways of having the mailers' hardware and software certified to assure the mail processing systems used by mailers are accurate as described in Memo to Mailers, August/September 1989, pp. 4 published by the United States Postal Service. In keeping with this endeavor, the Post Office has requested entities involved in the mailing business to provide solutions to the mail processing problems by using certification techniques that would assure the Post Office that mail received from the mailer has adequate postage.

SUMMARY OF THE INVENTION

In keeping with the need to certify mail processing equipment and the mail processed thereby, a system and method have been devised for monitoring the accuracy of weights of mail pieces. Mail inserts generally weigh the same amount and the recipients generally receive mail with the same contents. For example, a bill from a telephone company has a number of pages and inserts but the individual pages and inserts generally weigh the same although the number of each can vary. It will be appreciated that there are instances when periodic mailings will not have the same inserts from mailing to mailing or recipient to recipient.

A high speed weighing scale is located downstream from the mailer's mail processing unit to receive the mail pieces after the mail processing unit has inserted selected inserts into envelopes to form the mail pieces. A printout is made of the weights of mail pieces on a time related basis. For example, if a mail run contains five thousand pieces, a printout will be made of the weight of each mail piece from the beginning to the end of the mail run. Upon inspection of said printout, errors can be determined and corrective measures taken. The weights of mail pieces during a run of mail also can be exhibited on a monitor as the run progresses so that individual mail piece weights can be checked. If discrepancies are found, the run can be stopped and the errors corrected. Such errors would occur as a result of the scale weighing the mail pieces malfunctioning or the mail processing equipment not inserting properly. If the print-out of the mail piece weights and checking of the monitor show no discrepancies, the mail run can be certified to the post office by the mailer as being accurate.

DETAILED DESCRIPTION OF THE PREFERRED EMBODIMENTS

Figure 1:
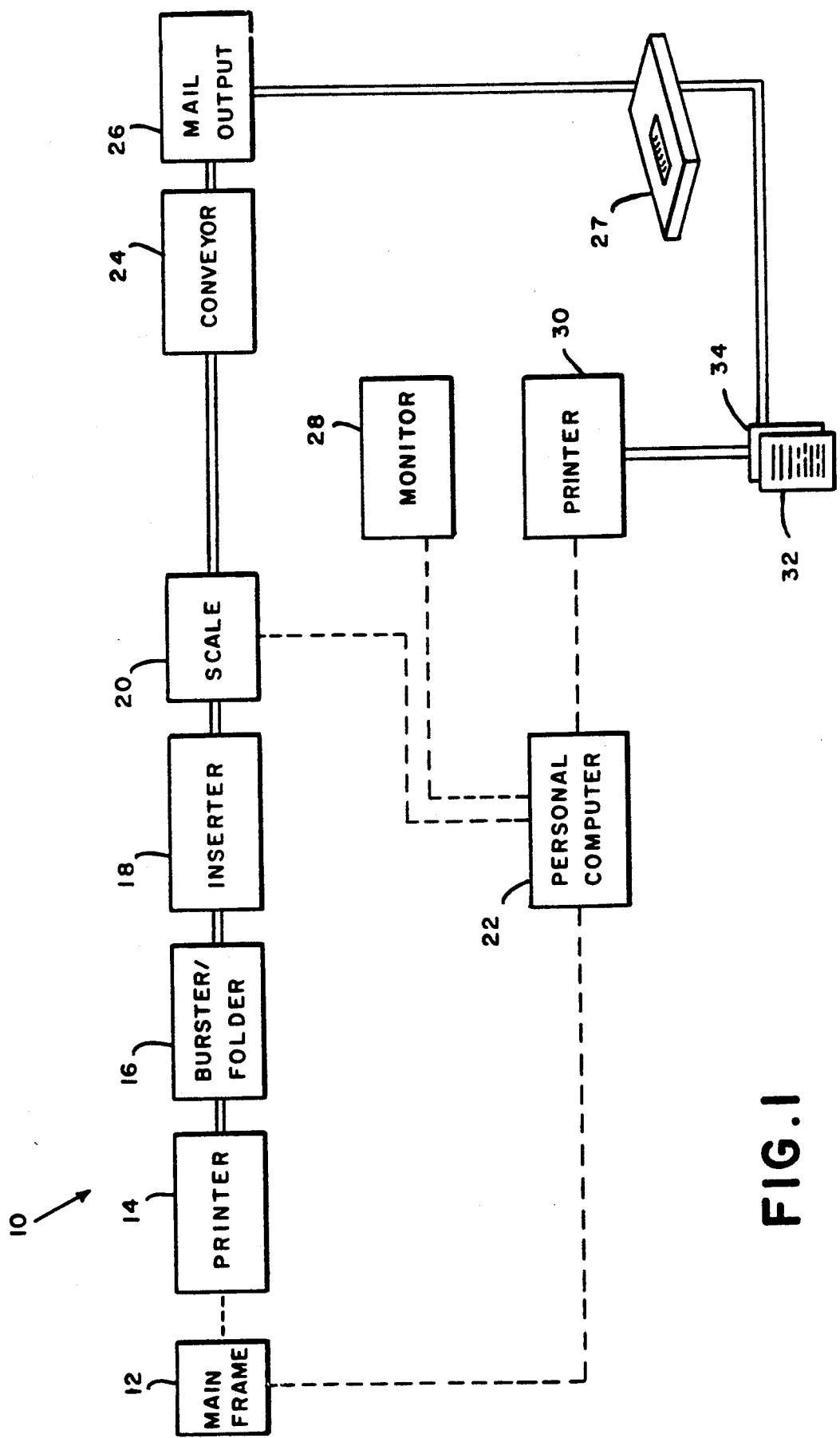
FIG. 1 block diagram of a system operative to carry out the instant invention.

With reference initially to FIG. 1, a mail piece weight monitoring system is shown generally at 10 with the dash lines indicating information transfer connections and the solid double lines indicating physical conveyance of articles such as envelopes, sheets, mail piece reports and the like. A processor 12, which can be a main frame computer such as an IBM Model 3090-400 available from IBM Corporation, is included in the system 10. Clearly, if less capacity is required a computer other than a mainframe can be used. Downstream from the main frame 12 is a printer 14 such as a high speed laser printer that is capable of receiving instructions from the main frame 12 for printing text, names, addresses and dash codes on computer fed sheets that can be in the form of a paper web. An example of such a printer is a Model 9300 laser printer available from Xerox Corp. This printer 14 will feed sheets to a burster/folder 16, such as a Model 3153 burster/folder available from Pitney Bowes Inc., that will separate the paper web into printed sheets and fold the sheets for insertion into a windowed envelope with the addresses exposed. Downstream from the burster/folder 16 is an inserter 18 that has a plurality of bins with inserts therein. The inserter receives printed pages from the burster/folder 16 and reads the dash codes thereon so as to select inserts that are to be placed into an envelope along with an appropriate sheet or sheets to form a mail piece, also known as letter mail. Examples of inserters that can be used for this purpose are Model No. 8300 series inserters available from Pitney Bowes Inc. For purposes of convenience, sheets and inserts will hereinafter be referred to collectively as inserts.

Downstream from the inserter 18 is a high speed scale 20 that is operative to receive mail pieces from the inserter and weigh the same quickly and accurately. An example of such a scale is shown and described in U.S. Pat. No. 4,778,018. A scale 20 of this type is able to determine the weight of a mail piece at the rate of two a second and with a resolution of 0.001 ounces and accuracy of at least 0.01 ounce. This allows the scale not only to process the mail pieces as quickly as the inserter 18 processes such mail pieces, but also has weight tolerances well within the limits of postal regulations for mail piece weights. The scale 20 is in electrical communication with a computer 22, the latter also being an electrical communication with the mainframe 12. The computer 22 can be a personal computer such as an IBM PS/2 model 50. A conveyor 24, which can be any of a number of commercially available conveyors, is downstream from the scale 20 for the purpose of delivering mail pieces to a mail output unit 26 which has trays 27 with labels attached thereto for receiving the mail pieces. A monitor in the form of a CRT display 28 is in communication with processor 22 whereby the on-going weights of mail pieces in real time can be displayed. It will be appreciated that in most instances the monitor 28 will be part of the computer 22. A printer 30 is in communication with the computer 22, the printer being capable of producing a print-out 32 (see FIGS. 2A and 2B) that replicates the data on the display, thereby providing a record of the weight of mail pieces over the entire mail run.

In operation, a number of address lists and lists of materials such as bills and advertisements to be received by various recipients of mail will be stored in the main frame 12. A list for a particular mail run will be selected by an operator. For example, the operator could select a list containing individuals having home insurance with a given insurance company whose payments are due on a given date. Upon the input of the list selection to the mainframe 12, information will be transferred to the printer 14 and the printer will print the names, addresses and inserter control codes, usually in dash or bar format, on sheet webs as well as the text to be printed. These sheet webs are then fed to the burster/folder 16. The printer 14 can also print a bill, invoice, accounting summary, request letter and the like on different sheets of the web. More specifically, more than one sheet can be inserted into an envelope with different types of information on each sheet. At the burster/folder 16, three operations take place. The sheets are separated, or bursted, into individual sheets, the printed codes on the sheets are scanned and the sheets are folded. These codes will indicate the inserts which are to be inserted with the sheets into an envelope by the inserter 18. This information is processed by the inserter 18 as the sheets are fed thereto. The mainframe 12 will also create a mail run file that contains the mail information for transfer to the computer 22 either directly or by storage media such as cards, tapes or discs.

After placing called for inserts into an envelope to thereby form a mail piece, the mail piece is conveyed to the scale 20 where the weight of each mail piece is measured. The measured weight of each mail piece is transferred to the computer 22 and thence the monitor 28. The weights of the mail pieces will be displayed in an accumulative manner by the monitor 28 as the mail pieces are weighed, assuming the mail run is within limits, as for example 500 mail pieces. Upon completion of a mail run, the computer 22 enables the printer 30 to produce a print-out 32 of the collective individual mail piece weights for an entire run of mail without limitations as to the number of mail pieces and also a certification statement 34 that reports the number of errors determined on the basis of weight. By viewing either the monitor 28 or the print-out 32, an operator will have a manifestation of the mail piece weight distribution. The monitor 28 will yield an on-going (real time) analysis of the mail piece weights whereas the print-out 32 will give a permanent record of the same.

Figure 2A:
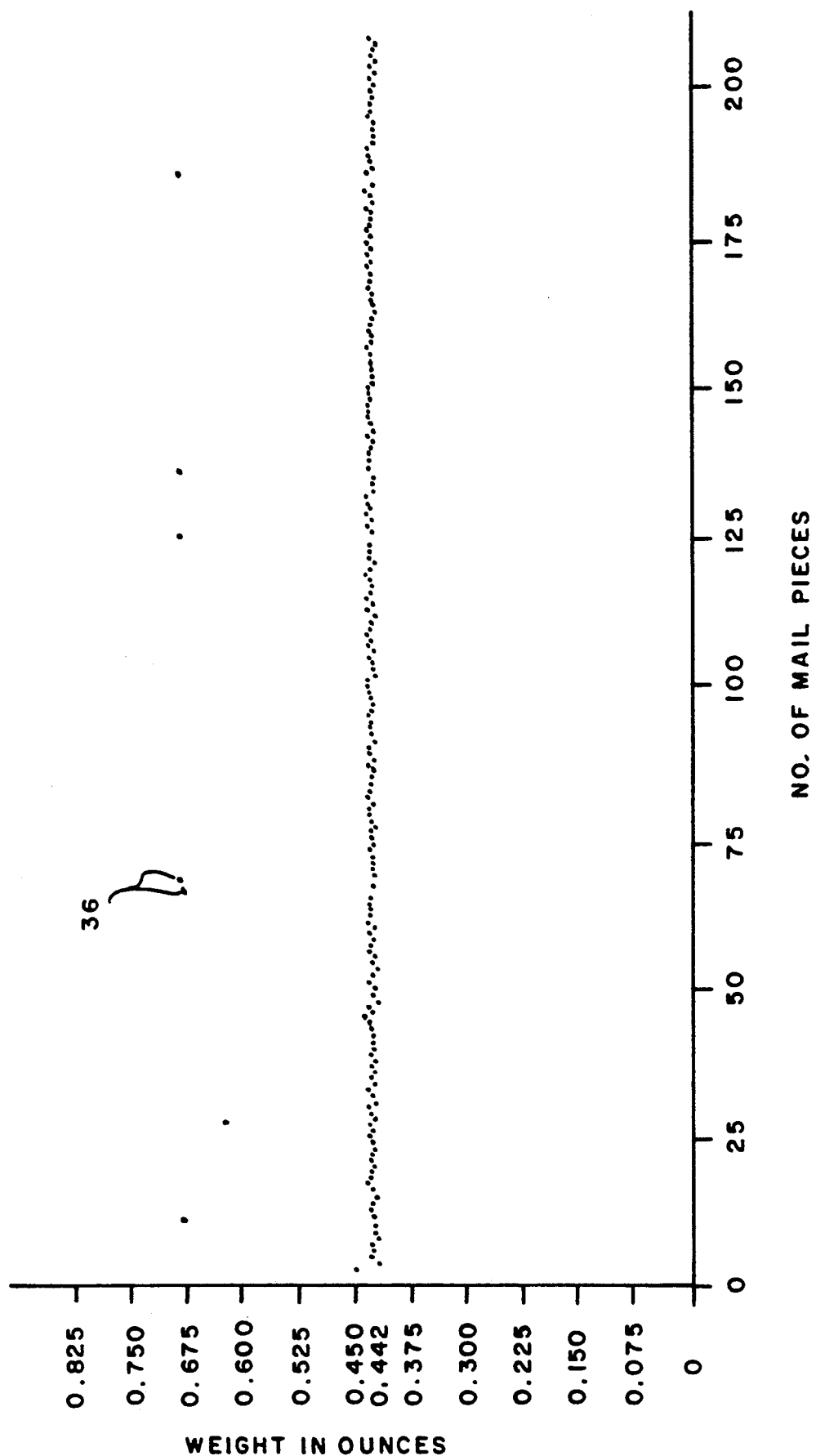
FIGS. 2A and 2B each shows a print-out of weights measured by the system of FIG. 1.
Figure 2B:
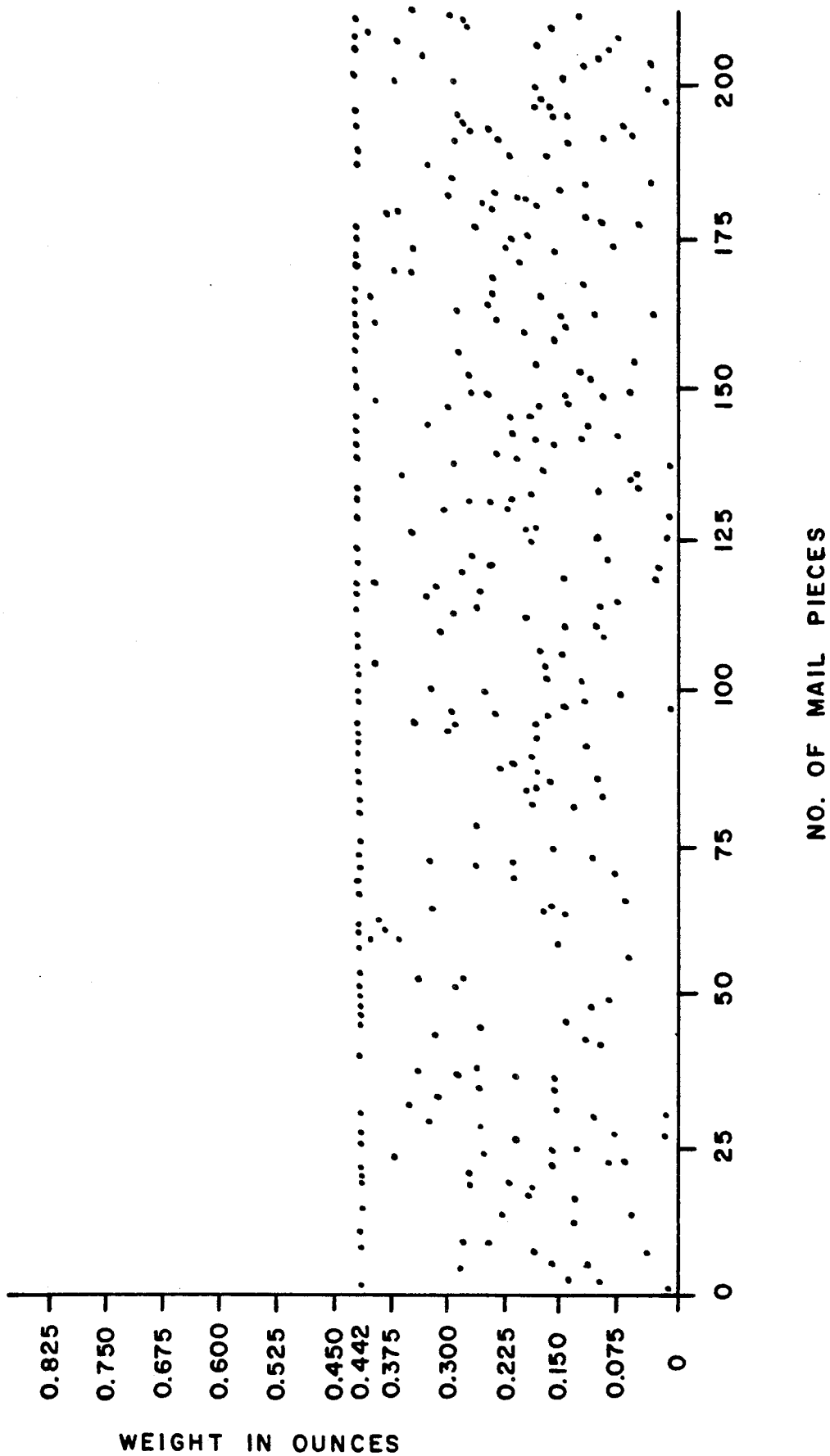

With reference to FIG. 2A, a print-out is shown that represents a record of measured mail piece weights that is regular and somewhat in a pattern, each dot representing a mail piece weight. Although only 200 mail pieces are monitored, it will be appreciated that the number generally will be higher, as for example 750 mail pieces. It will be noted that a few of the mail piece weights 36 are substantially higher than the other weights. These weights 36 indicate that double inserts have been placed in an envelope. Because of the few errors in this particular batch, the mail would be allowed to be sent to the post office but the certification statement 34 would contain a disclosure so that these errors can be corrected and an accounting therefor made. With such print-out 32, the operator will conclude that the inserter 18 and scale 20 are functioning properly and that weights are likely to be correct. On the other hand, the graph shown in FIG. 2B shows an irregular pattern with a high number of inaccurate weights. This indicates that the scale is not functioning properly. In this particular case, a loose screw found in the weighing mechanism occasioned the results.

For purposes of convenience and efficiency, control software could be provided to the computer 22 whereby unexpected weights are colored by the monitor and printer. Alternatively, only the weights that are unexpected could be displayed or printed.

Thus, what has been shown and described are method and apparatus for quickly and efficiently monitoring the weights of mail pieces during the processing thereof.

What is claimed is:

1. A mail piece weight monitoring system, comprising
   a first computer having mail list information stored therein,
   a printer in communication with said first computer for printing mailing information on sheets, a folder located downstream from said printer for folding said sheets,
   a mail processing apparatus downstream from said folder for receiving said sheets and having means for inserting selected ones of said sheets and inserts into envelopes to form mail pieces,
   a scale for individually receiving mail pieces from said mail processing apparatus and weighing said mail pieces individually,
   a second computer in communication with said scale for receiving measured mail piece weights from said scale, and
   means for collectively displaying the measured weights of individual mail pieces in real time.

2. The system of claim 1 including a second printer in communication with said second computer for printing said mail piece weights on a print-out.

3. The system of claim 1 including a monitor for displaying said mail piece weights.

4. A method of monitoring the accuracy of mail piece weights, the steps comprising:
   weighing a plurality of mail pieces individually to obtain the measured weights thereof, and
   displaying the collective measured weights of said plurality of mail pieces in real manner.

5. The method of claim 4 including displaying the weights on a monitor.

6. The method of claim 5 including printing a print out of the weights of the plurality of mail pieces in real time.

7. A method of determining the achieving of expected weights of a run of mail pieces, the steps comprising:
   inserting sheets and selected inserts into a plurality of envelopes to form mail pieces,
   determining at least one expected weight for the mail pieces based upon inserts therein,
   weighing each main piece individually to obtain the weight thereof,
   graphically displaying in real time the collective, individual weights obtained during the mail run, and
   determining the achieving of the expected weights of the mail pieces by comparing said at least one expected weight and the mail piece weights obtained.

8. The method of claim 7 including displaying the graph upon a monitor.

9. A mail piece weight monitoring system, comprising:
   a scale for receiving mail pieces and weighing the mail pieces individually,
   a processor in communication with said scale for receiving measured weights from said scale, and
   means in communication with said processor for simultaneously displaying the measured weights of a plurality of individually weighed mail pieces in real time.

10. The system of claim 9 wherein the representation of the weight of the mail pieces by said display means is by a series of dots, the location of each dot indicating the weight of a respective mail piece.

* * * * *